United States Patent
Atarashi

(10) Patent No.: US 7,142,808 B2
(45) Date of Patent: Nov. 28, 2006

(54) SATELLITE BROADCAST RECEIVER APPARATUS INTENDED TO REDUCE POWER CONSUMPTION

(75) Inventor: Hiroshi Atarashi, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 597 days.

(21) Appl. No.: 10/680,228

(22) Filed: Oct. 8, 2003

(65) Prior Publication Data
US 2004/0077307 A1   Apr. 22, 2004

(30) Foreign Application Priority Data
Oct. 17, 2002  (JP) ............................. 2002-303363

(51) Int. Cl.
*H04H 1/00* (2006.01)
(52) U.S. Cl. .................. 455/3.02; 455/131; 455/189.1; 455/311
(58) Field of Classification Search ............... 455/3.02, 455/20, 22, 427, 21, 12.1, 62, 63.3, 131, 455/189.1, 311
See application file for complete search history.

(56) References Cited

U.S. PATENT DOCUMENTS

| | | | |
|---|---|---|---|
| 3,825,691 A | * | 7/1974 | Honma et al. ............... 370/436 |
| 6,832,071 B1 | * | 12/2004 | Nakamura et al. .......... 455/3.02 |
| 2003/0043942 A1 | * | 3/2003 | Ono ............................. 375/347 |
| 2004/0077324 A1 | * | 4/2004 | Wieck ....................... 455/234.1 |
| 2005/0075087 A1 | * | 4/2005 | Yamaji et al. ............ 455/232.1 |

FOREIGN PATENT DOCUMENTS

JP   2000-252741 A   9/2000

* cited by examiner

*Primary Examiner*—Matthew D. Anderson
*Assistant Examiner*—Tan Trinh
(74) *Attorney, Agent, or Firm*—Birch, Stewart, Kolasch & Birch, LLP

(57) ABSTRACT

A satellite broadcast receiver apparatus includes a plurality of signal conversion units provided corresponding to a plurality of signals transmitted from one or more satellites, each signal conversion unit frequency-converting a corresponding signal for output; a signal terminal that can input/output an electrical signal; a signal select circuit provided between the plurality of signal conversion units and the signal terminal to transmit a desired signal among the signals output from the plurality of signal conversion units to the signal terminal in accordance with a control signal applied to the signal terminal; and a power supply control unit controlling voltage supply to the plurality of signal conversion units. The power supply control unit supplies an operating voltage to at least one of the plurality of signal conversion units selected in accordance with information based on the control signal, and suppresses supply of the operating voltage to the remaining signal conversion units.

10 Claims, 8 Drawing Sheets

US 7,142,808 B2

SATELLITE BROADCAST RECEIVER APPARATUS INTENDED TO REDUCE POWER CONSUMPTION

CROSS REFERENCE TO RELATED APPLICATION

This Nonprovisional application claims priority under 35 U.S.C. § 119(a) on Patent Application No(s). 2002-303363 filed in Japan on Oct. 17, 2002, the entire contents of which are hereby incorporated by reference.

BACKGROUND OF THE INVENTION

1. Field of the Invention

The present invention relates to a satellite broadcast receiver apparatus, more particularly, to a satellite broadcast receiver apparatus intended to reduce power consumption.

2. Description of the Background Art

Now, two broadcasting satellites having a downlink signal frequency band corresponding to the BSS (Broadcasting Satellite Service) frequency band of 12.2–12.7 GHz are launched in the sky above North America in the proximity of 110° and 119° west longitude. There is also a communication satellite having a downlink signal frequency band corresponding to the FSS (Fixed Satellite Service) frequency band of 11.7–12.2 GHz launched in the proximity of 91° west longitude.

In the BSS frequency band, signals through two types of circular polarization, i.e., left-handed polarized wave and right-handed polarized wave, are employed as the transmission signals from the satellite. In the FSS frequency band, signals through two types of linear polarization, i.e. horizontal polarization and vertical polarization, are employed as the transmission signals from the satellite.

In the previous era where there were few broadcasting satellites, reception of single signals from one satellite through one satellite broadcast receiver apparatus was only required. In accordance with the recent increase of broadcasting satellites, there is the growing need for a device that can receive a plurality of signals from one or more satellites through one satellite broadcast receiver apparatus.

A configuration of a conventional satellite broadcast receiver apparatus that can receive a plurality of signals (for example, horizontal polarization and vertical polarization) from a satellite through one receiving antenna is disclosed in, Japanese Patent Laying-Open No. 2000-252741, for example.

FIG. 8 is a block diagram of a configuration of a conventional satellite broadcast receiver apparatus 103 that can receive a plurality of signals from one or more satellites. FIG. 8 exemplifies a configuration of a conventional satellite broadcast receiver apparatus that can receive two types of signals from two satellites.

Referring to FIG. 8, satellite broadcast receiver apparatus 103 includes receiving terminals 10a, 10b, 10c and 10d receiving left-handed and right-handed polarized wave signals corresponding to two types of circularly polarized wave signals in the BSS frequency band of 12.2–12.7 GHz. Receiving terminals 10a, 10b, 10c and 10d are provided in one antenna (not shown).

Receiving terminals 10a and 10b receive a left-handed polarized wave signal L1 and a right-handed polarized wave signal R1 from a satellite at west longitude 119°, respectively. Receiving terminals 10c and 10d receive a right-handed polarized wave signal R2 and left-handed polarized wave signal L2 from a satellite at west longitude 110°, respectively. In the present specification, left-handed polarized wave signal L1, right-handed polarized wave signal R1, right-handed polarized wave signal R2 and left-handed polarized wave signal L2 are also simply referred to as L1, R1, R2 and L2, respectively.

Satellite broadcast receiver apparatus 103 further includes a low noise amplifier (LNA) 11 that is an amplifier of low noise, bandpass filters (BPF) 12a, 12b, 12c and 12d passing through only signals having a predetermined frequency, a mixer 13 providing signal outputs of the intermediate frequency band of 950 MHz–1450 MHz, and a local oscillation circuit 40 providing a signal output of a predetermined frequency.

LNA 11 includes LNA 11a, LNA 11b, LNA 11c and LNA 11d. LNA 11a and LNA 11b amplify L1 and R1, respectively. LNA 11c and LNA 11d amplify R2 and L2, respectively.

BPFs 12a and 12b remove the image frequency (for example, frequency in the vicinity of 10 GHz) corresponding to the unrequired frequency band from L1 and R1 amplified by LNA 11a and LNA 11b, respectively, to output the image frequency removed signals. Similarly, BPFs 12c and 12d remove the image frequency from R2 and L2 amplified by LNA 11c and LNA 11d, respectively, to output the image frequency removed signals.

Mixer 13 includes a mixer 13a, a mixer 13b, a mixer 13c and a mixer 13d. Mixers 13a and 13b respectively multiply L1 and R1 having the image frequency removed by a signal of a predetermined frequency (for example, 11.25 GHz) output from a local oscillation circuit 40 to output signals L1' and R1', respectively, having an intermediate frequency of 950 MHz–1450 MHz.

Mixers 13c and 13d respectively multiply R2 and L2 having the image frequency removed by a signal of a predetermined frequency output from local oscillation circuit 40 to output signals R2' and L2', respectively, having an intermediate frequency of 950 MHz–1450 MHz.

In other words, each of signals L1, R1, R2 and L2 has the frequency converted by LNA 11a, LNA 11b, LNA 11c and LNA 11d, respectively, BPF 12a, BPF 12b, BPF 12c and BPF 12d, respectively, and mixers 13a, 13b, 13c, and 13d, respectively, to be provided as signals L1', R1', R2' and L2', respectively.

Satellite broadcast receiver apparatus 103 further includes a switch circuit 15 switching a plurality of signals for output, intermediate frequency (IF) amplifiers 16a and 16b amplifying the signal output from switch circuit 15, capacitors 17a and 17b cutting off the direct current component of an input signal, and input/output terminals 21a and 21b.

Satellite broadcast receiver apparatus 103 further includes receivers 22a and 22b connected to input/output terminals 21a and 21b, respectively, diodes 20a and 20b, a control microcomputer 18, a voltage conversion circuit 19 converting the voltage of an input signal to a desired voltage level, and a power supply control circuit 14. Receivers 22a and 22b are a television, a video, and the like incorporating a satellite broadcasting tuner. Control microcomputer 18 internally includes a resistor to lower the voltage of a signal from a receiver to a desired voltage level.

Switch circuit 15 can output two of the input signals L1', R1', R2' and L2' to IF amplifiers 16a and 16b, respectively. Switch circuit 15 can also output one of input signals L1', R1', R2' and L2' to one of IF amplifiers 16a and 16b. Furthermore, switch circuit 15 can output one of input signals L1', R1', R2' and L2' to both IF amplifiers 16a and 16b. The signal output from switch circuit 15 is provided to IF amplifier 16a or 16b. The signal applied to IF amplifiers 16a and 16b is passed through capacitors 17a and 17b, respectively, to be provided to input/output terminals 21a and 21b, respectively.

The control signal output from receivers 22a and 22b to select a desired signal among a plurality of signals from one or more satellites is applied to input/output terminals 21a and 21b, as well as to control microcomputer 18 and voltage conversion circuit 19 via diodes 20a and 20b, respectively. Control microcomputer 18 outputs to switch circuit 15 a select signal SWC1 upon receiving a control signal from receiver 22a, and a select signal SWC2 upon receiving a control signal from receiver 22b. Select signals SWC1 and SWC2 are signals to select a desired signal among signals L1', R1', R2' and L2'.

The voltage supplied from a receiver is generally higher than the voltage used in circuitry in a satellite broadcast receiver apparatus. Therefore, voltage conversion circuit 19 removes the alternating current component of the output signal having a predetermined voltage from at least one of receivers 22a and 22b for reduction to a predetermined voltage level. This voltage is supplied to power supply control circuit 14.

Power supply control circuit 14 supplies voltage to circuitry required for operation of satellite broadcast receiver apparatus 103 when at least one of receivers 22a and 22b is connected to input/output terminal 21a or 21b. Specifically, satellite broadcast receiver apparatus 103 attains an inactive state when receivers 22a and 22b are not connected to any of input/output terminals 21a and 21b. By way of illustration, power supply control circuit 14 of satellite broadcast receiver apparatus 103 is shown so as to supply voltage only to LNA 11 and mixer 13. In practice, power supply control circuit 14 also supplies voltage to control microcomputer 18, IF amplifiers 16a and 16b, and local oscillation circuit 40.

Control microcomputer 18 receives a control signal from receiver 22a or 22b to transmit select signal SWC1 or SWC2 to switch circuit 15. Switch circuit 15 responds to select signal SWC1 or SWC2 to provide one of input signals L1', R1', R2' and L2' to IF amplifier 16a or 16b.

Receiver 22a or 22b can receive a desired signal from two types of signals from two satellites, i.e. four types of signals, by sending a control signal to control microcomputer 18.

The above-described conventional satellite broadcast receiver apparatus that can receive a plurality of signals from one or more satellites is rendered active by a voltage supplied from a receiver connected to the input/output terminal and has the voltage supplied to all LNAs and mixers even if only one of a plurality of types of signals from one or more satellites is selected. Therefore, the LNA and mixer not required for the frequency conversion operation were constantly operated. In other words, the conventional satellite broadcast receiver apparatus consumes power that was not required.

Useless power consumption leads to heat generation of the satellite broadcast receiver apparatus per se, whereby the electronic components of internal circuitry will be used under high temperature. This will reduce the lifetime of the electronic components. Heat generation will adversely affect the lifetime of the product of the satellite broadcast receiver apparatus.

Temperature increase within the satellite broadcast receiver apparatus will also cause the frequency of the internal local oscillation circuit and the like to vary greatly. The probability of erroneous operation of the satellite broadcast receiver apparatus will become higher.

SUMMARY OF THE INVENTION

An object of the present invention is to reduce power consumption in a satellite broadcast receiver apparatus that can selectively receive a plurality of transmission signals from one or more satellites.

According to an aspect of the present invention, a satellite broadcast receiver apparatus includes a plurality of signal conversion units provided corresponding to a plurality of signals transmitted from a satellite, respectively, each signal conversion unit frequency-converting a corresponding signal for output, a signal terminal that can input/output an electrical signal, a signal select circuit provided between the plurality of signal conversion units and the signal terminal to selectively transmit a signal output from the plurality of signal conversion units to the signal terminal in response to a control signal applied to the signal terminal to select at least one of the plurality of signals, and a power supply control unit to control voltage supply to the plurality of signal conversion units. The power supply control unit supplies an operating voltage to at least one of the plurality of signal conversion units selected in accordance with information based on the control signal, and suppresses supply of the operating voltage to other signal conversion units.

The main advantage of the present invention is that a plurality of signals from one or more satellites can be selectively received in accordance with the control signal from the signal terminal. Also, power consumption can be reduced since operating voltage is supplied only to the selected signal conversion unit. Thus, power consumption can be reduced. As a result, heat generation in the satellite broadcast receiver apparatus can be suppressed to allow extension of the lifetime of the apparatus. Suppression of heat generation in the satellite broadcast receiver apparatus per se is advantageous in that the probability of erroneous operation of the satellite broadcast receiver apparatus can be reduced.

Preferably, the satellite broadcast receiver apparatus includes a reception control unit connected to the signal terminal to generate and provide to the signal terminal the control signal that is a voltage signal, and a voltage conversion circuit to convert the voltage applied to the signal terminal to a predetermined level for generation of the operating voltage.

Further preferably, the control signal is a signal having a direct current voltage set to a different level in accordance with which of the plurality of signals is selected.

Further preferably, the control signal is a digital signal to indicate information representative of which of the plurality of signals is to be selected. The control signal is set at either a first voltage level or a second voltage level differing from the first voltage level for every predetermined period.

Further preferably, the control signal is a signal having the direct current voltage of a predetermined level selectively overlapped with an alternating current voltage of a predetermined frequency in accordance with the information representative of which of the plurality of signals is to be selected.

Further preferably, the predetermined level is set in accordance with the information representative of which of the plurality of signals is to be selected.

Further preferably, the control signal is a signal having a direct current voltage of a predetermined level overlapped with a predetermined standard signal to represent digital data.

Further preferably, the plurality of signals are transmitted from a plurality of satellites.

Further preferably, the signal terminal is provided in plurality. A plurality of reception control units are connected to the plurality of signal terminals, respectively. Each reception control unit generates a control signal independent of each other. The signal select circuit selectively transmits the signal output from the plurality of signal conversion units to at least one of the plurality of signal terminals corresponding to the plurality of reception control units, respectively, in accordance with respective independent control signals.

Since a plurality of signal terminals are provided, a plurality of signals from one or more satellites can be selectively received at the plurality of reception control units.

Further preferably, the power supply control unit supplies an operating voltage to at least one signal conversion unit selected by one of the independent control signals among the plurality of signal conversion units, and suppresses supply of the operating voltage to other signal conversion units.

Since the operating voltage is supplied to only the selected signal conversion unit, power consumption can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
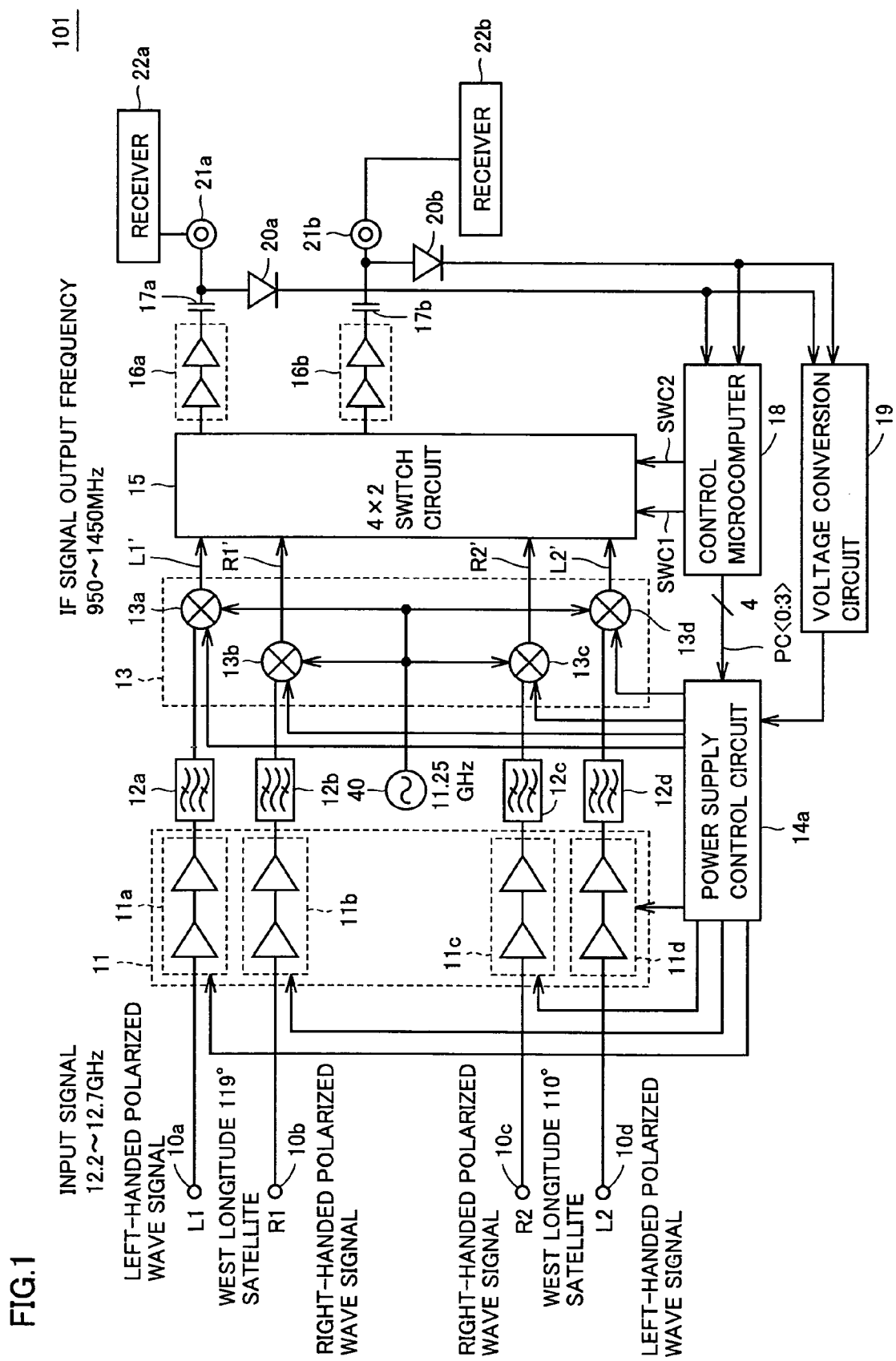
FIG. 1 is a block diagram of a configuration of a satellite broadcast receiver apparatus according to a first embodiment of the present invention.

Embodiments of the present invention will be described hereinafter with reference to the drawings. In the drawings, the same reference characters represent the same or corresponding components.

First Embodiment

Figure 8:
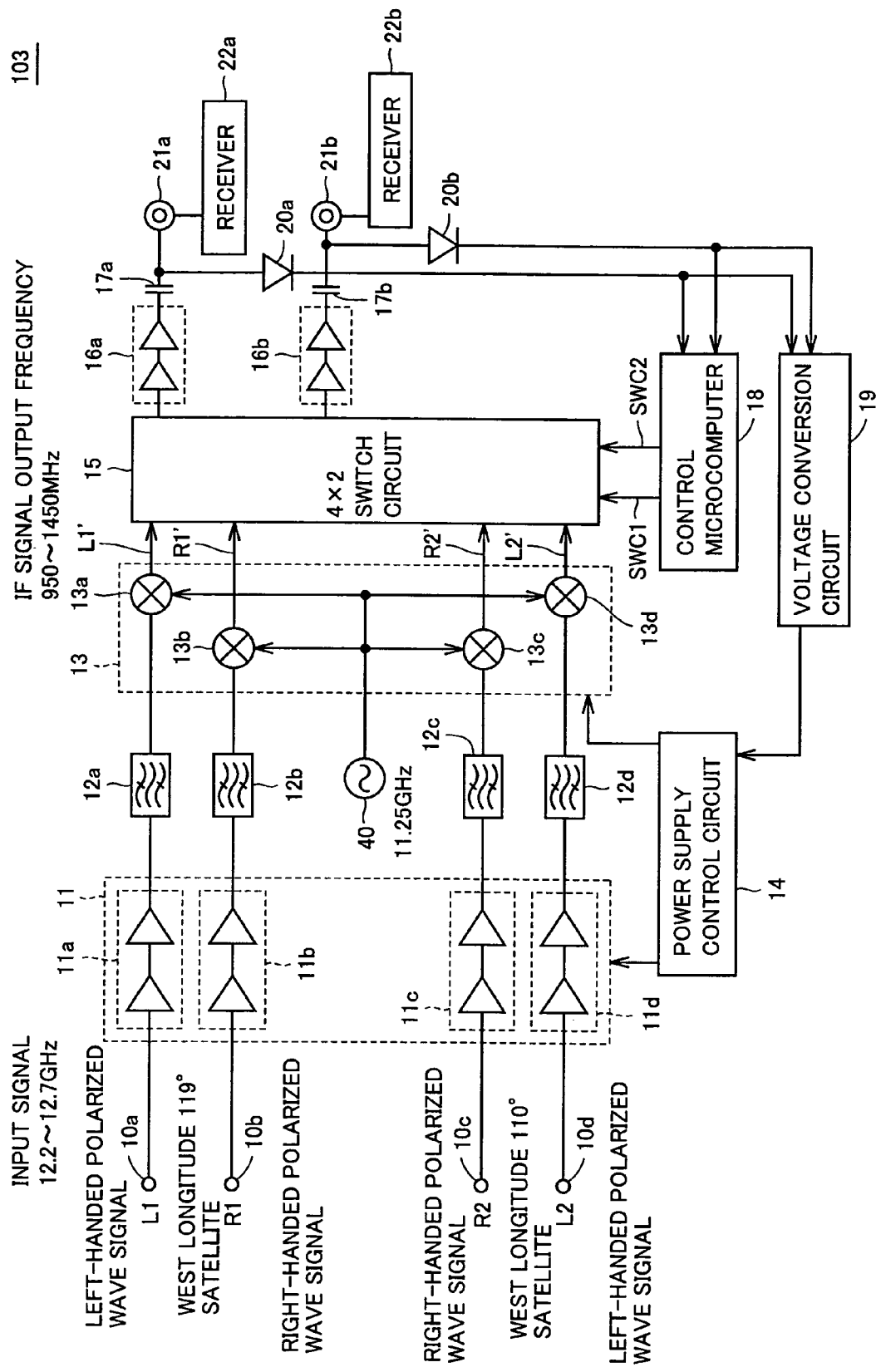
FIG. 8 is a block diagram of a configuration of a conventional satellite broadcast receiver apparatus that can receive a plurality of signals from one or more satellites.

Referring to FIG. 1, a satellite broadcast receiver apparatus 101 according to a first embodiment of the present invention differs from the conventional satellite broadcast receiver apparatus 103 shown in FIG. 8 in that a power supply control circuit 14a is provided instead of power supply control circuit 14. Satellite broadcast receiver apparatus 101 includes a plurality of signal conversion units provided corresponding to the plurality of signals from one or more satellites. Each signal conversion unit converts the frequency of a corresponding signal. For example, one signal conversion unit is formed of an LNA 11a, a BPF 12a and a mixer 13a to frequency-convert a left-handed polarized wave signal L1 from a satellite at west longitude 119° into a signal L1'.

Switch circuit 15 operates as a signal select circuit selecting a desired signal from signals L1', R1', R2' and L2'.

Satellite broadcast receiver apparatus 101 differs from satellite broadcast receiver apparatus 103 in that control microcomputer 18 outputs a power supply control signal PC<0:3> to power supply control circuit 14a which supplies a voltage to LNA 11a, LNA 11b, LNA11c and LNA11d, and to mixers 13a, 13b, 13c and 13d, respectively, through different routes. The remaining configuration is similar to that of satellite broadcast receiver apparatus 103 shown in FIG. 8. Therefore, detailed description thereof will not be repeated. Power supply control signal PC<0:3> is a signal to control the voltage supplied from power supply control circuit 14a to respective circuits.

In the present specification, PC<0:3> is a generic representation of PC<0>–PC<3>. In the present specification, a signal of a plurality of bits constituting the same signal is represented by the same designation, when indicated generically. The binary high voltage state and low voltage state of signals and signal lines are also represented as "H level", "1", and "L level", "0", respectively.

Figure 2:
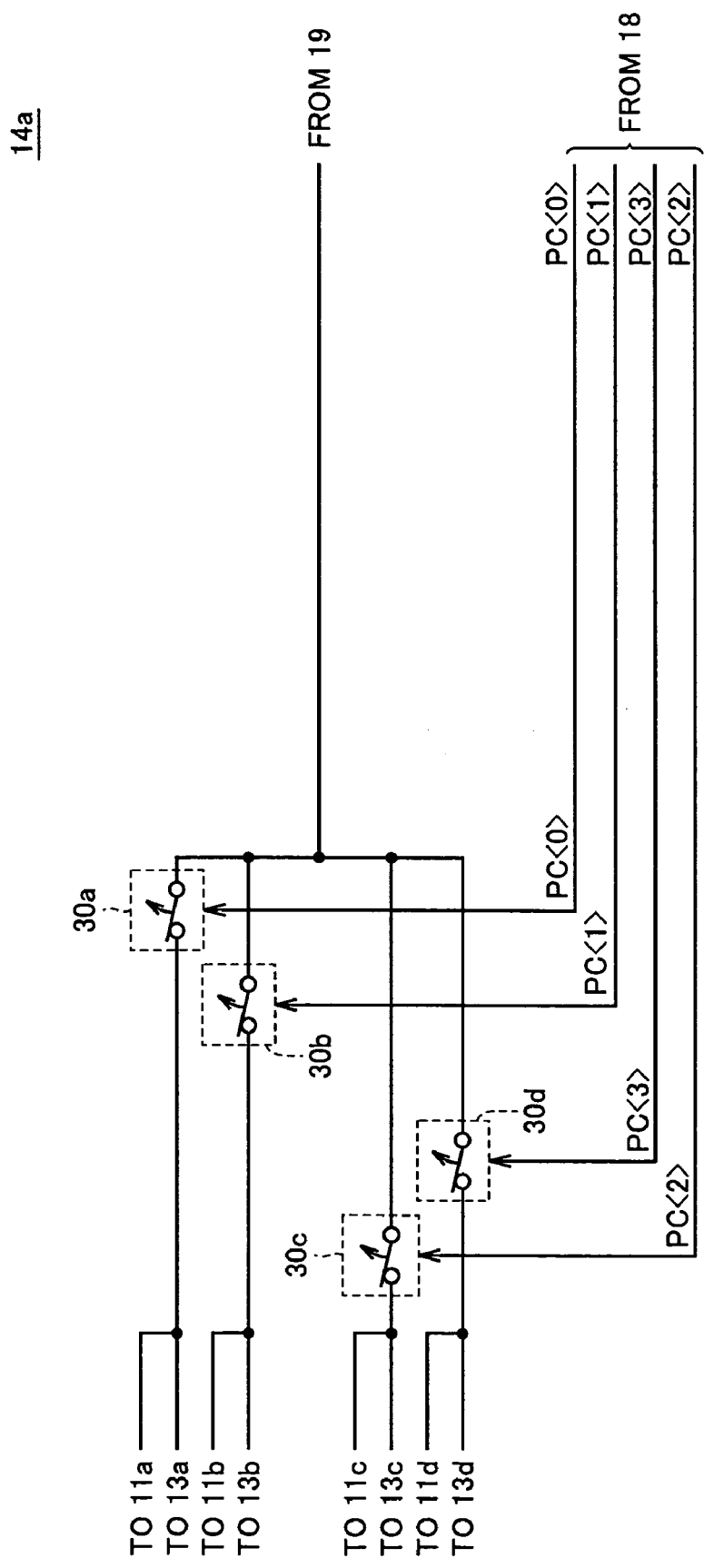
FIG. 2 is a block diagram of an internal configuration of a power supply control circuit of the first embodiment.

Referring to FIG. 2, voltage control circuit 14a includes switches 30a, 30b, 30c and 30d. Switch 30a is provided between voltage conversion circuit 19 and LNA 11a, mixer 13a to electrically couple voltage conversion circuit 19 with LNA 11a and mixer 13a when power supply control signal PC<0> applied from control microcomputer 18 is at an H level. Switch 30a electrically decouples voltage conversion circuit 19 from LNA 11a and mixer 13a when power supply control signal PC<0> is at an L level.

Switch 30b is provided between voltage conversion circuit 19 and LNA 11b, mixer 13b. Switch 30c is provided between voltage conversion circuit 19 and LNA 11c, mixer 13c. Switch 30d is provided between voltage conversion circuit 19 and LNA 11d, mixer 13d. Power supply control signals PC<1>, PC<2> and PC<3> from control microcomputer 18 are applied to switches 30b, 30c and 30d, respectively. Switches 30b, 30c and 30d electrically couple voltage conversion circuit 19 with the LNA and mixer corresponding to the relevant switch and decouples voltage conversion circuit 19 from the LNA and mixer corresponding to the relevant switch when power supply control signal PC<1:3> applied to each switch is at an H level and an L level, respectively.

The operation of receiving a plurality of signals from one or more satellites is similar to that of a conventional satellite broadcast receiver apparatus 103. Therefore, description thereof will not be repeated.

Four examples to reduce power consumption in satellite broadcast receiver apparatus 101 while selecting a desired signal from a plurality of signals from one or more satellites will be described hereinafter.

(First Method of Selecting Signal from Satellite)

The power supply control operation when a signal from a satellite is selected in satellite broadcast receiver apparatus 101 will be described hereinafter with reference to FIGS. 1 and 2. It is assumed that control microcomputer 18 is programmed to transmit a select signal to switch circuit 15 to select frequency-converted signals L1', R1', R2' and L2' from one or more satellites, respectively, when the voltage of the control signal input from the receiver is, for example, 10–12V, 13–15V, 16–18V and 19–21V, respectively.

Figure 3:
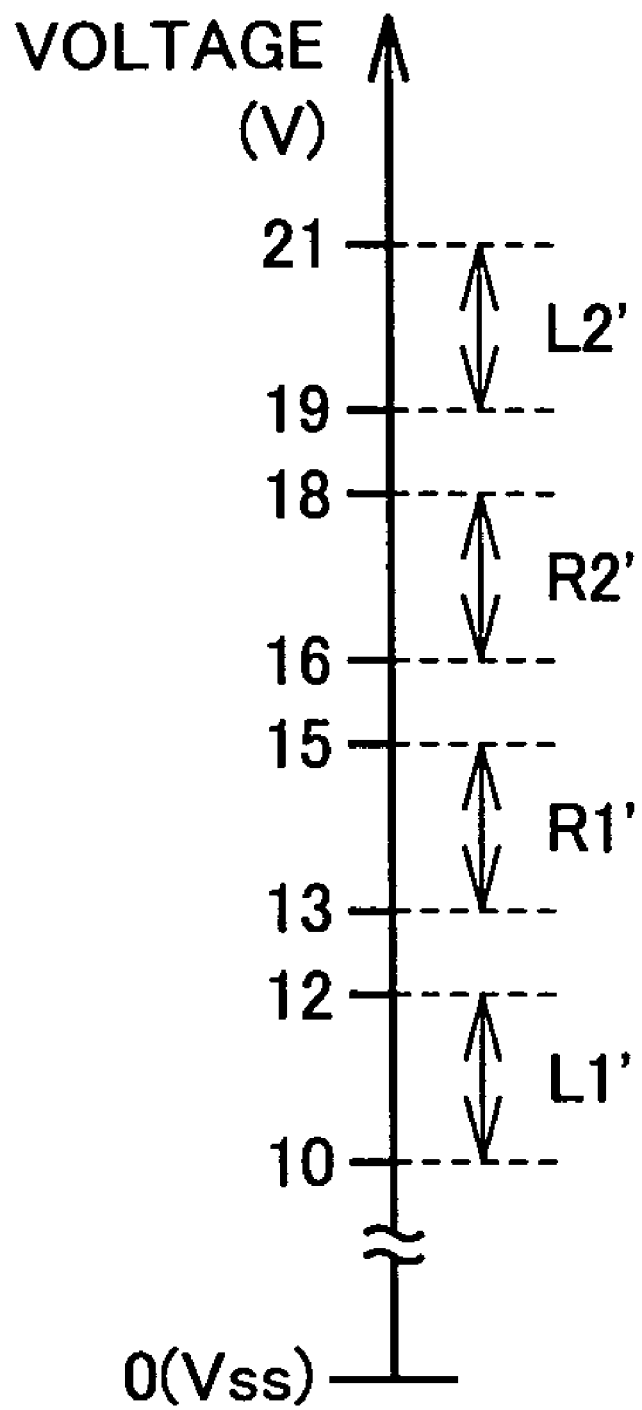
FIG. 3 schematically represents signals from one or more satellites, having the frequency converted corresponding to the voltage of the control signal.

Referring to FIG. 3, a control signal having a voltage of 10–12V, 13–15V, 16–18V and 19–21V corresponds to frequency-converted signals L1', R1'R2' and L2' from one or more satellites, respectively.

An exemplified operation of satellite broadcast receiver apparatus 101 when a desired signal is to be selected among a plurality of signals from one or more satellites will be described with reference to FIGS. 1 and 2. Control microcomputer 18 provides to switch circuit 15 a select signal SWC1 to output signal L1' to IF amplifier 16a corresponding to receiver 22a when a control signal having the voltage of 10–12V is supplied from receiver 22a.

Control microcomputer 18 sets power supply control signals PC<0> and PC<1:3> to an H level and an L level, respectively, at the same time a select signal SWC1 to select signal L1' is output. As a result, a predetermined voltage is supplied to LNA 11 and mixer 13a constituting a frequency conversion circuit used to frequency-convert signal L1 to signal L1'. Voltage supply to LNAs 11b, 11c and lid, and to mixers 13b, 13c and 13d is suppressed.

Therefore, the circuit group to frequency-convert a signal other than the selected signal among the plurality of types of signals from one or more satellites attains an inactive state. As a result, satellite broadcast receiver apparatus 101 can receive through a receiver only the desired signal from a satellite without any waste in power.

(Second Method of Selecting Signal from Satellite)

The previous first signal selection method is directed to selecting a desired signal from a plurality of signals from one or more satellites depending upon the voltage level of the control signal. The previous first signal selection method is disadvantageous in that the desired signal cannot be selected if the control microcomputer erroneously determines the voltage level of 12V of the control signal as 13V due to quantization error of control microcomputer 18. The second method is directed to increasing the probability of selecting a desired signal.

Another example of a power supply control operation when a signal is selected from a satellite at satellite broadcast receiver apparatus 101 will be described with reference to FIGS. 1 and 2. It is assumed that control microcomputer 18 is programmed so as to provide a determination output of "0" and "1" when the voltage of the control signal from a receiver is 13V and 18V, respectively.

The receiver transmits to control microcomputer 18 a logic signal corresponding to a combination of "0" and "1" by switching the voltage of the control signal to 13V or 18V. It is assumed that a signal of one bit retains a constant voltage value for a predetermined time (for example, 8 milliseconds). For example it is assumed that control microcomputer 18 is programmed so that, when the receiver forms a logic signal of 8 bits, for example, a select signal to select the signal from the satellite at west longitude 119° and 110° is transmitted to switch circuit 15 when signals of "0, 0, 1, 1, 0, 0, 1, 1 and 1, 1, 0, 0, 1, 1, 0, 0", respectively, are received within a predetermined time (for example, 64 milliseconds) from the receiver.

It is also assumed that control microcomputer 18 is programmed so as to transmit to switch circuit 15 a select signal to select a left-handed polarized wave signal and a right-handed polarized wave signal from the signals from one or more satellites when a signal having a constant voltage value of 13V and 18V, respectively, is input for at least a predetermined time (for example, 3 seconds) after reception of a logic signal of 8 bits from the receiver. By such programming of control microcomputer 18, the probability of selecting a signal that is not the desired signal due to quantization error is reduced. Therefore, the probability of selecting a desired signal can become higher than that of the first signal select method.

Figure 4:
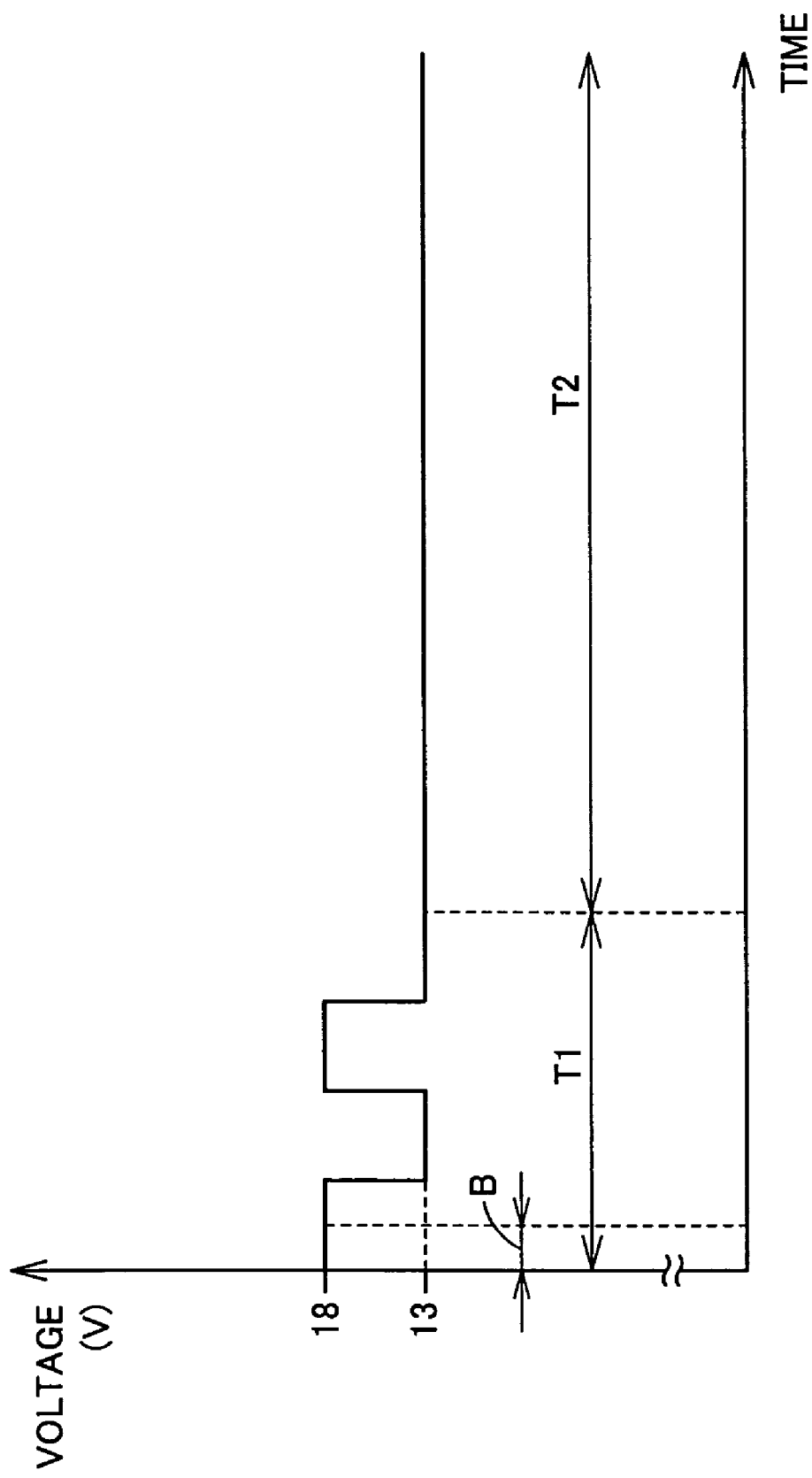
FIG. 4 schematically represents a combination of a logic signal and a signal having a constant voltage.

Referring to FIG. 4, B represents the time of a signal of one bit to be recognized by control microcomputer 18. T1 represents the time of a logic signal of 8 bits to be recognized by control microcomputer 18. T2 represents the duration of a control signal retaining a constant voltage for at least a predetermined period of time. By way of example, it is assumed that B is 8 milliseconds, T1 is 64 milliseconds, and T2 is at least 3 seconds in FIG. 4. The control signal corresponding to the period of T1 is a combination of the voltages of 13V and 18V, by way of example, and is a logic signal recognized as "1, 1, 0, 0, 1, 1, 0, 0" by control microcomputer 18. The duration of T2 corresponds to a control signal maintaining the voltage level of 13V.

An example of an operation of satellite broadcast receiver apparatus 101 when a desired signal is to be selected among a plurality of signals from one or more satellites will be described with reference again to FIGS. 1 and 2. Control microcomputer 18 provides to switch circuit 15 a select signal SWC2 to output a signal L2' that is a frequency-converted version of left-handed polarized wave signal L2 from the satellite at west longitude 110° to IF amplifier 16b corresponding to receiver 22b when a signal having the voltage of 13V is input for at least 3 seconds after receiving the logic signal of "1, 1, 0, 0, 1, 1, 0, 0" from receiver 22b within the period of 64 milliseconds.

Control microcomputer 18 sets power supply control signals PC<3> and PC<0:2> to an H level and an L level, respectively, simultaneous to the output of select signal SWC2 to select L2'. As a result, a predetermined voltage is supplied to LNA 11d and mixer 13d constituting the frequency conversion circuit employed to frequency-convert signal L2 into L2' while voltage supply to LNA 11a, LNA 11b and LNA 11c, and to mixers 13a, 13b and 13c is suppressed.

Therefore, the circuit group to frequency-convert a signal other than the selected signal among the plurality of types of signals from the satellites attains an inactive state. As a result, the receiver can receive only the desired signal from the satellite without wasting power in satellite broadcast receiver apparatus 101.

The present embodiment is described based on an example of selecting a desired signal from a plurality of signals from one or more satellites by combination of a logic signal and a constant voltage. A desired signal from a plurality of signals from one or more satellites may be selected just by a logic signal from a receiver. For example, if control microcomputer 18 is programmed so as to select frequency-converted signals L1', R1', R2' and L2' from one or more satellites when a logic signal of "0, 1, 0, 1, 0, 1, 0, 1", "1, 0, 0, 1, 0, 1, 0, 1", "0, 1, 0, 1, 0, 1, 1, 0" and "1, 0, 0, 1, 0, 1, 1, 0" is input from the receiver, respectively, a desired signal can be selected from the satellite through usage of logic signals alone.

(Third Method of Selecting Signal from Satellite)

Another example of a power supply control operation when a signal is selected from one or more satellites in satellite broadcast receiver apparatus 101 will be described with reference to FIGS. 1 and 2. It is assumed that control microcomputer 18 is programmed so as to determine whether a signal of a predetermined frequency (for example, 38 kHz) is overlaid on the voltage of a control signal input from a receiver. It is also assumed that control microcomputer 18 is programmed so as to transmit a select signal to switch circuit 15 to select signal L1' or R1' depending upon whether the control signal having the voltage value of 13V is overlapped or not, respectively, with a signal of 38 kHz, and select signal R2' or L2' depending upon whether the control signal having the voltage value of 18V is overlapped or not, respectively, with a signal of 38 kHz. By such programming of control microcomputer 18, the probability of selecting a signal that is not a desired signal due to quantization error is reduced. Accordingly, the probability of selecting a desired signal can become higher than that of the first signal select method.

Figure 5:
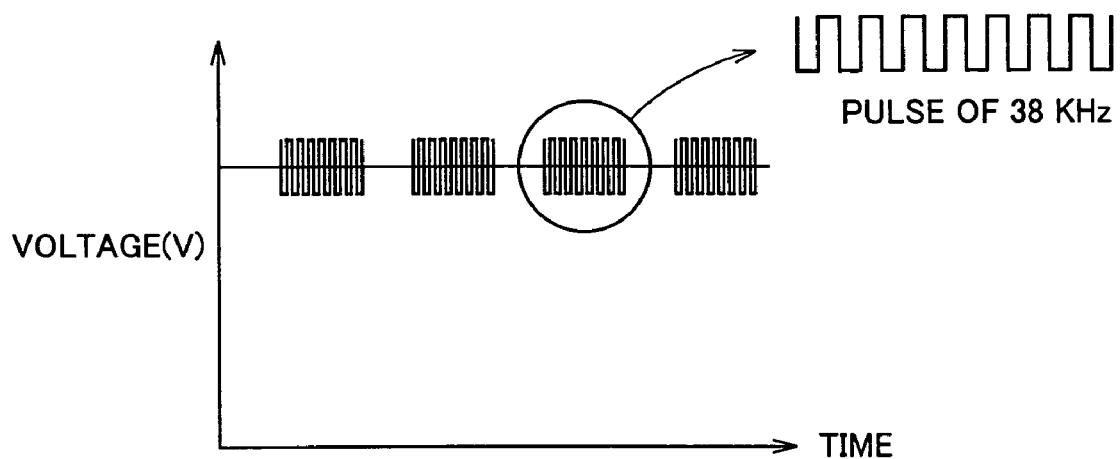
FIG. 5 schematically represents a signal having a constant voltage value overlapped with a signal having a predetermined frequency.

FIG. 5 represents a signal of a constant voltage value overlapped with a pulse signal having the frequency of 38 kHz as an example. In accordance with the third signal selection method, signal L1' or R1' is selected depending upon whether a control signal having the voltage of 13V is overlapped or not, respectively, with the signal of 38 kHz. Signal R2' or L2' is selected depending upon whether the control signal having the voltage of 18V is overlapped or not, respectively, with the signal of 38 kHz.

An example of the operation of satellite broadcast receiver apparatus 101 when a plurality of signals are selected from one or more satellites will be described with reference again to FIGS. 1 and 2. Control microcomputer 18 provides to switch circuit 15 a select signal SWC1 to output R2' to IF amplifier 16 corresponding to receiver 22a when an input control signal having the voltage value of 18V is overlapped with a signal of 38 kHz from receiver 22a.

Control microcomputer 18 sets power supply control signal PC<2> to an H level and power supply control signals PC<0>, PC<1> and PC<3> to an L level simultaneously to the output of select signal SWC1 to select R2'. As a result, a predetermined voltage is supplied to LNA 11c and mixer 13c constituting the frequency conversion circuit used to frequency-convert signal R2 to R2'. Voltage supply to LNAs 11a, 11b and 1id and to mixers 13a, 13b and 13d is suppressed.

Therefore, the circuit group to frequency-convert a signal other than the selected signal among the plurality of types of signals from one or more satellites attains an inactive state. As a result, satellite broadcast receiver apparatus 101 can receive only the desired signal from the satellite through a receiver without wasting power.

(Fourth Method of Selecting Signal from Satellite)

Still another example of a power supply control operation when a signal is selected from one or more satellites in satellite broadcast receiver apparatus 101 will be described with reference to FIGS. 1 and 2. It is assumed that control microcomputer 18 is programmed so as to determine whether the control signal applied from a receiver is overlapped with a signal of a predetermined frequency (for example 22 kHz). The relevant signal of a predetermined frequency employs a Diseq (Digital Satellite Equipment Control) signal as an example of a predetermined standard signal directed to controlling the equipment for satellite broadcasting specified by the satellite associated organization in Europe.

Figure 6:
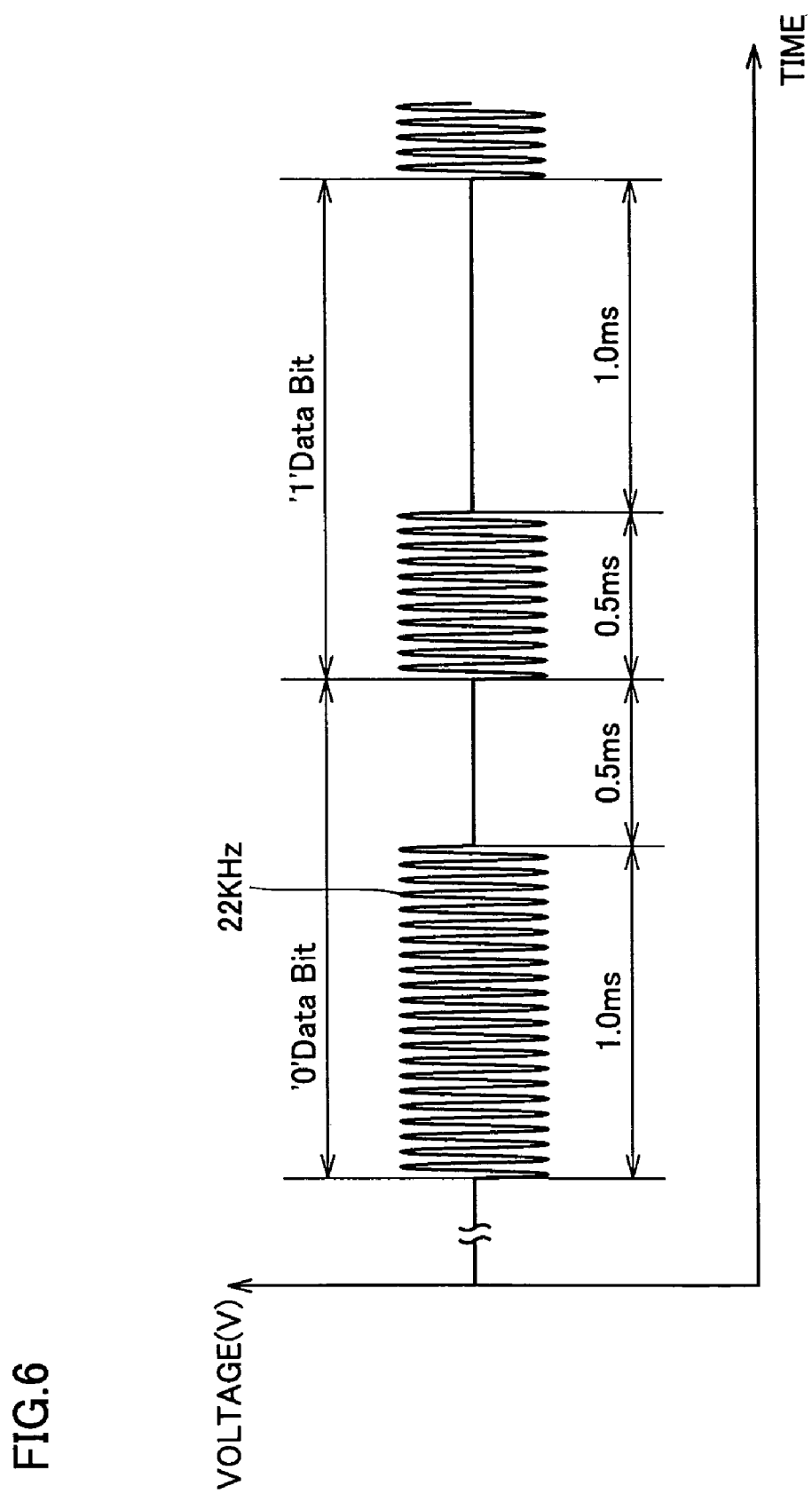
FIG. 6 is a schematic diagram to describe a Diseq (Digital Satellite Equipment Control) signal.

Referring to FIG. 6, a Diseq signal represents data "0" or "1" with 1.5 milliseconds as one bit unit. The Diseq signal represents "0" when the frequency of 22 kHz is maintained continuously for 1.0 millisecond and then the frequency of 0 Hz is maintained for 0.5 milliseconds thereafter. The Diseq signal represents "1" when the frequency of 22 kHz is maintained continuously for 0.5 milliseconds and then the frequency of 0 Hz is maintained for 1.0 millisecond thereafter.

It is assumed that control microcomputer 18 is programmed so as to identify a signal having, for example, a signal of a predetermined voltage (for example 13V) overlapped with a Diseq signal formed of the logic of 8 bits. It is also assumed that control microcomputer 18 is programmed so as to transmit a select signal to switch circuit 15 to select L1', R1', R2' and L2' when a signal is input having the Diseq signal forming the logic of "0, 1, 0, 1, 0, 1, 0, 1", "1, 0, 0, 1, 0, 1, 0, 1", "0, 1, 0, 1, 0, 1, 1, 0" and "1, 0, 0, 1, 0, 1, 1, 0", respectively, from the receiver is overlapped. By such programming of control microcomputer 18, the probability of selecting a signal that is not desired signal due to quantization error by control microcomputer 18 is reduced. Therefore, the probability of selecting a desired signal becomes higher than that by the first method of signal selection.

An example of an operation of satellite broadcast receiver apparatus 101 when a desired signal among a plurality of signals is selected from one or more satellites will be described. Control microcomputer 18 output to switch circuit 15 a select signal SWC2 to output R1' to IF amplifier 16b corresponding to receiver 22b when a signal is input having the control signal of voltage level of 13V from receiver 22b overlapped with the Diseq signal forming the logic of "1, 0, 0, 1, 0, 1, 0, 1".

Control microcomputer 18 sets power supply control signal PC<1> to an H level and sets power supply control signals PC<0> and PC<2:3> to an L level, simultaneous to the output of select signal SWC2 to select R1', respectively. As a result, a predetermined voltage is supplied to LNA 11b and mixer 13b constituting the frequency conversion circuit employed to frequency-convert R1 into R1'. Voltage supply to LNAs 11a, 11c and 11d, and to mixers 13a, 13c and 13d is suppressed.

Therefore, the circuit group to frequency-convert a signal other than the selected signal among the plurality of types of signals from one or more satellites attains an inactive state. As a result, satellite broadcast receiver apparatus 101 can receive only the desired signal from one or more satellites through the receiver without wasting power.

As described above, satellite broadcast receiver apparatus 101 according to the first embodiment of the present invention is intended to reduce power consumption while allowing selection of a desired signal among a plurality of signals from one or more satellites. As a result, heat generation in the satellite broadcast receiver apparatus can be suppressed to allow extension of the lifetime of the satellite broadcast receiver apparatus product. Suppressing heat generation in the satellite broadcast receiver apparatus per se is also advantageous in that the probability of erroneous operation of the satellite broadcast receiver apparatus is reduced.

[Modification of First Embodiment]

Figure 7:
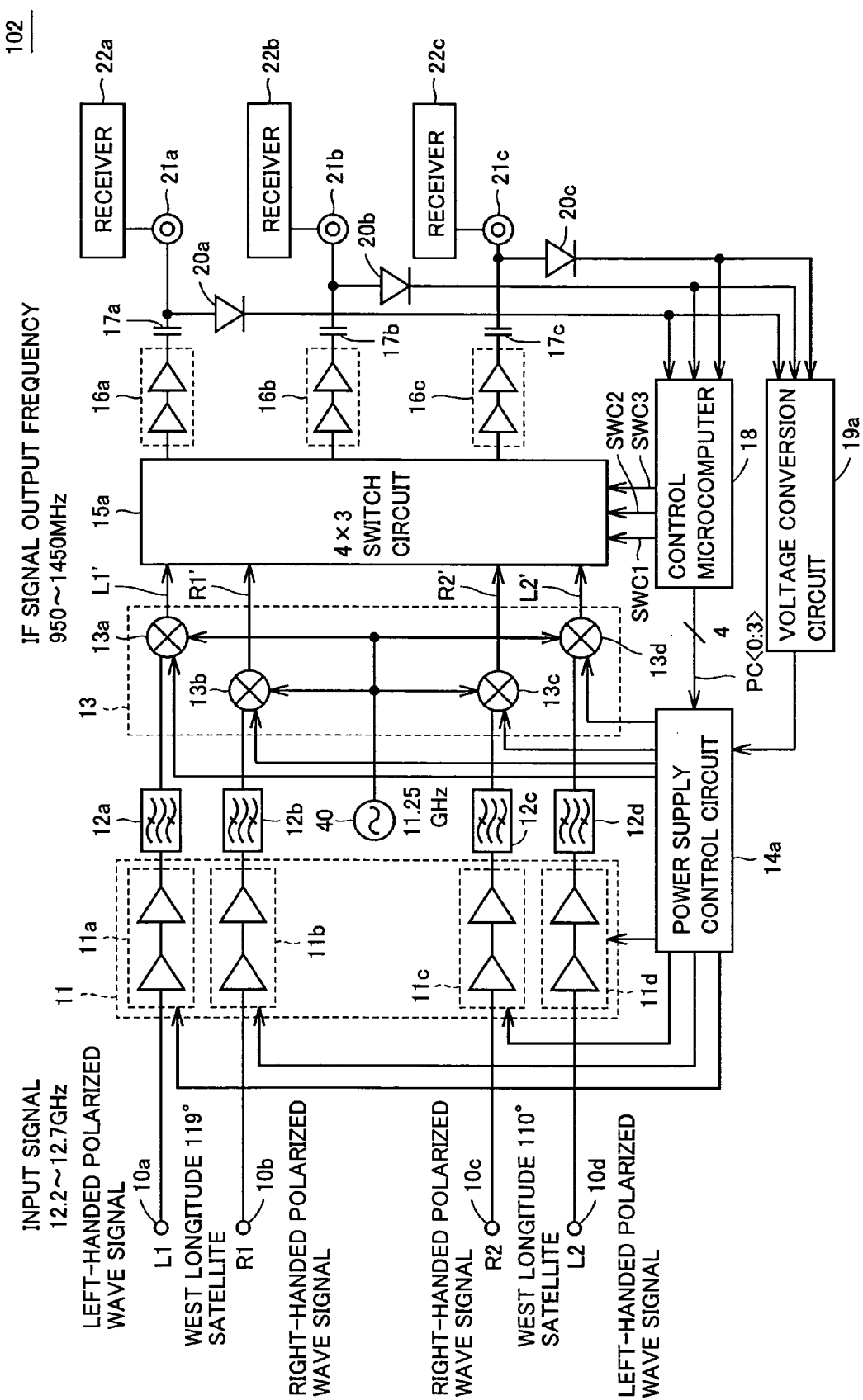
FIG. 7 is a block diagram of a configuration of a satellite broadcast receiver apparatus according to a modification of the first embodiment.

Referring to FIG. 7, a satellite broadcast receiver apparatus 102 according to a modification of the first embodiment differs from satellite broadcast receiver apparatus 101 of FIG. 1 in the addition of an input/output terminal 21c and a receiver 22c.

Accordingly, satellite broadcast receiver apparatus 102 differs from satellite broadcast receiver apparatus 101 in that a switch circuit 15a and a voltage conversion circuit 19a are provided instead of switch circuit 15 and voltage conversion circuit 19, respectively. Furthermore, satellite broadcast receiver apparatus 102 includes an IF amplifier 16c, a capacitor 17c, and a diode 20c.

Satellite broadcast receiver apparatus 102 differs from satellite broadcast receiver apparatus 101 in that a control signal from receiver 22c is further applied to control microcomputer 18 and voltage conversion circuit 19a via diode 20c, and microcomputer 18 responds to the control signal from receiver 22c to transmit a select signal SWC 3 to switch circuit 15a and power supply control signal PC<0:3> to power supply control circuit 14a. The remaining configuration is similar to that of satellite broadcast receiver apparatus 101 of FIG. 1, and detailed description thereof will not be repeated. Select signal SWC 3 is a signal to select a desired signal among signals L1', R1', R2' and L2'.

Switch circuit 15a can provide three of input signals L1', R1', R2', and L2' to IF amplifiers 16a, 16b and 16c, respectively. Switch circuit 15a can also output the two of input signals L1', R1', R2' and L2' to two or three of IF amplifiers 16a, 16b and 16c among input signals L1', R1', R2' and L2', provided that only one signal among the plurality of signals is input to each of IF amplifiers 16a, 16b and 16c from switch circuit 15a. Therefore, when two of signals L1', R1', R2' and L2' are output to all IF amplifiers 16a, 16b and 16c, at least one of L1', R1', R2' and L2' is output to two of IF amplifiers 16a, 16b and 16c.

Furthermore, switch circuit 15a can output one of input signals L1', R1', R2' and L2' to one, two, or all three of IF amplifiers 16a, 16b and 16c.

The signal output from switch circuit 15a is provided to IF amplifiers 16a, 16b or 16c. Each signal applied to IF amplifiers 16a, 16b and 16c passes through capacitors 17a, 17b and 17c, respectively, to be applied to input/output terminals 21a, 21b and 21c, respectively.

Voltage conversion circuit 19a removes the alternating current component of an output signal having a predetermined voltage from at least one of receivers 22a, 22b and 22c to reduce the voltage to a desired level. This voltage is supplied to power supply control circuit 14a.

The operation of receiving a plurality of signals from one or more satellites is similar to that of conventional satellite broadcast receiver apparatus 103. Therefore, detailed description thereof will not be repeated.

Satellite broadcast receiver apparatus 102 can employ the above-described four methods directed to reducing power consumption while selecting a desired signal from the plurality of signals from one or more satellites described in the first embodiment. The operation thereof is similar to that of satellite broadcast receiver apparatus 101. Therefore, detailed description thereof will not be repeated.

Satellite broadcast receiver apparatus 102 according to a modification of the first embodiment offers the advantage of selecting a desired signal among a plurality of signals from one or more satellites while reducing power consumption by a control signal from at least one of the three receivers, in addition to the advantage offered by satellite broadcast receiver apparatus 101 of the first embodiment, by virtue of the function of switch circuit 15a.

The modification of the first embodiment was described based on a configuration that can select three different signals among four signals. The present invention is not limited to such a configuration. For example, by using a switch circuit that can output four signals individually and further providing an IF amplifier, a capacitor, an input/output terminal and a receiver, a desired signal from a plurality of signals from one or more satellites can be selected by a control signal from at least one of the four receivers while reducing power consumption. Therefore, the present invention allows a desired signal to be selected from more receivers by setting a configuration that can connect four or more receivers.

The first embodiment or the modification of the first embodiment are typical of a configuration receiving two different types of signal from two satellites. The present invention is not limited to such a configuration. For example, a signal from three or more satellites can be received by providing further in number an LNA, a BPF, a mixer, an IF amplifier, a capacitor, an input/output terminal, a diode, and the like required thereof, and modify the switch circuit to select a plurality of signals from one or more satellites.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A satellite broadcast receiver apparatus comprising:
   a plurality of signal conversion units provided corresponding to a plurality of signals transmitted from a satellite, respectively, each signal conversion unit frequency-converting a corresponding signal for output,
   a signal terminal that can input/output an electrical signal,
   a signal select circuit provided between said plurality of signal conversion units and said signal terminal to selectively transmit a signal output from said plurality of signal conversion units to said signal terminal in accordance with a control signal applied to said signal terminal to select at least one of said plurality of signals, and
   a power supply control unit controlling voltage supply to said plurality of signal conversion units,
   wherein said power supply control unit supplies an operating voltage to at least one of said plurality of signal conversion units selected in accordance with information based on said control signal, and suppresses supply of said operating voltage to other signal conversion units.

2. The satellite broadcast receiver apparatus according to claim 1, further comprising:
   a reception control unit connected to said signal terminal to generate and provide to said signal terminal said control signal that is a voltage signal; and
   a voltage conversion circuit converting an input voltage to said signal terminal to a predetermined level to generate said operating voltage.

3. The satellite broadcast receiver apparatus according to claim 1, wherein said control signal is a signal having a direct current voltage set to a different level in accordance with which of said plurality of signals to be selected.

4. The satellite broadcast receiver apparatus according to claim 1, wherein said control signal is a digital signal to indicate information representative of which of said plurality of signals is to be selected, and set to one of a first voltage level and to a second voltage level differing from said first voltage level for every predetermined period.

5. The satellite broadcast receiver apparatus according to claim 1, wherein said control signal is a signal having a direct current voltage of a predetermined level selectively overlapped with an alternating current voltage of a predetermined frequency in accordance with information representative of which of said plurality of signals is to be selected.

6. The satellite broadcast receiver apparatus according to claim 5, wherein said predetermined level is set in accordance with said information representative of which of said plurality of signals is to be selected.

7. The satellite broadcast receiver apparatus according to claim 1, wherein said control signal is a signal having a direct current voltage of a predetermined level overlapped with a predetermined standard signal to represent digital data.

8. The satellite broadcast receiver apparatus according to claim 1, wherein said plurality of signals are transmitted from a plurality of said satellites.

9. The satellite broadcast receiver apparatus according to claim 1, wherein said signal terminal is provided in plurality, and further comprising a plurality of reception control units connected to said plurality of signal terminals, respectively, each said reception control unit generating said control signal independent of each other, wherein said signal select circuit selectively transmits a signal output from said plurality of signal conversion units to at least one of said plurality of signal terminals corresponding to said plurality of reception control units, respectively, in accordance with respective independent control signals.

10. The satellite broadcast receiver apparatus according to claim 9, wherein said power supply control unit supplies said operating voltage to at least one signal conversion unit selected by one of said independent control signals among said plurality of signal conversion units, and suppresses supply of said operating voltage to other signal conversion units.

* * * * *